United States Patent [19]

Morrow et al.

[11] Patent Number: 5,298,214
[45] Date of Patent: Mar. 29, 1994

[54] METHOD OF DERIVING POLYSTYRENE AND POLYOLEFIN PLASTICS COMPOSITE FROM RECYCLED PLASTICS

[75] Inventors: Darrell R. Morrow, East Brunswick; Thomas J. Nosker, Somerset, both of N.J.; Kenneth E. VanNess, Lexington, Va.; Richard W. Renfree, Westfield, N.J.

[73] Assignee: Rutgers, The State University, Piscataway, N.J.

[21] Appl. No.: 605,677

[22] Filed: Oct. 30, 1990

[51] Int. Cl.⁵ ............................................. B29C 47/36
[52] U.S. Cl. ............................... 264/211.12; 264/349; 264/DIG. 69; 264/331.17; 425/DIG. 46; 525/240
[58] Field of Search ................... 264/211.12, 171, 174, 264/210.6, 45.3, 37, DIG. 69, 331.17, 349; 425/DIG. 46; 525/240

[56] References Cited

U.S. PATENT DOCUMENTS 4,386,188  5/1983  Grancio et al. .................. 264/210.6

FOREIGN PATENT DOCUMENTS 55460  7/1982  European Pat. Off. .

OTHER PUBLICATIONS

Renfree et al., "Physical Characteristics and Properties of Profile Extrusion Produced from Post Consumer Commingled Plastic Wastes," ANTEC, 1989, pp. 1809-1812.

Nosker et al., "Recycle Polystyrene, Add Value to Commingled Products," Plastics Engineering, Feb. 1990.

"Refined Commingled Plastics Family of Materials (RCM)-Formulations/Processing/Properties," presentation at Industry Advisory Council Meeting, Jun. 7 & 8, 1990.

Nosker et al., "Improvements in the Properties of Commingled Plastics by the Selective Mixing of Plastics Waste," RETEC, Oct. 30-31, 1989.

*Primary Examiner*—Jeffery Thurlow
*Assistant Examiner*—Mathieu Vargot
*Attorney, Agent, or Firm*—Lerner, David, Littenberg, Krumholz & Mentlik

[57]  ABSTRACT

Polystyrene having a high storage modulus is blended with a polyolefin, and the blend is converted to a mixed melt which is caused to flow and then a cooled and solidified to form a substantially solid two phase composite. The high storage modulus polystyrene provides particularly good results. Especially good properties are achieved at about 35% polystyrene by weight. Either or both components may be recycled materials and may incorporate minor amounts of other plastics as contaminants.

20 Claims, 3 Drawing Sheets

METHOD OF DERIVING POLYSTYRENE AND POLYOLEFIN PLASTICS COMPOSITE FROM RECYCLED PLASTICS

BACKGROUND OF THE INVENTION

The present invention relates to the art of plastics materials and plastics processing, and more particularly relates to the art of making plastics composites, particularly from recycled materials.

Synthetic polymers such as polyolefins, particularly polyethylene, have come into ever increasing use for many household applications such as packages for consumer goods, wrapping film, bags and the like. Modern methods of making these polymers have created strong and economical materials which have gained progressively increasing acceptance by consumers. These materials are extraordinarily durable, and are essentially impervious to decay. Modern production methods make articles from these materials so economically that the same often are regarded as disposable items, to be used once and discarded. There has been a growing realization that the discarded materials should not be disposed of in landfills or by incineration, but rather should be reclaimed to recover these materials in usable form.

Scrap consisting of a single type of polymer ordinarily can be recycled by standard industrial processes. However, mixed plastic wastes pose more difficult problems. Ordinarily, plastics collected from consumers such as those retrieved from household wastes incorporate many different types of plastics and accordingly are not normally considered suitable for recycling by the conventional techniques used with pure plastics. Such mixed waste streams are referred to in the recycling art as "postconsumer" wastes. Techniques have recently been developed for reclaiming the most valuable and most readily identifiable constituents of such a mixed waste stream. With the development of improved techniques for recycling soft drink containers made principally of polyethylene terrepthalate ("PET") with or without polyethylene parts, it has become economically feasible to segregate such bottles from the mixed waste stream and recycle the so segregated bottles. These bottles constitute an appreciable fraction of the incoming waste stream and can be identified by their size and shape so that it is feasible to segregate the soft drink bottles manually. Likewise, milk containers, which are almost universally formed from high density polyethylene ("HDPE") constitute a substantial and readily identifiable fraction of the waste stream which can be segregated manually. Once the milk containers have been segregated from the remainder of the waste stream and cleaned, they provide essentially pure high density polyethylene which can be recycled in conventional ways.

These efforts, however, provide only a partial solution to the problem. After segregation of the PET and HDPE containers, there is still a fraction, commonly referred to as "tailings", which consists of many different types of plastic items, including films, containers, bags and the like. It is ordinarily not feasible to separate different items constituting this mixture as they are present in relatively small quantities and are difficult to identify. Moreover, some of the items in this mixture incorporate laminates or composites containing different types and/or grades of plastics. Ordinarily, the tailings fraction includes more than about 50 percent and typically more than about 75 percent by weight polyolefins, of which the majority ordinarily are polyethylene.

It has been observed heretofore that the tailings fraction can be comminuted, melted and melt-formed. However, the formed articles typically have relatively poor physical properties, such as low compressive modulus and low yield stress. These factors severely limit the types of products which can be made from the tailings fraction and hence limit the market for the recycled products. Likewise, the market for recycled high density polyethylene such as that derived from milk containers is limited by the relatively low strength and stiffness of this material.

There have accordingly been attempts heretofore to enhance the strength and stiffness of recycled HDPE. As set forth in the paper "Physical Characteristics and the Properties of Profile Extrusions Produced from Post Consumer Co-mingled Plastic Wastes", *Renfree et al.*, 1989 Antec-47th Annual Technical Conference of the Society of Plastics Engineers, polystyrene can be coextruded with high density polyethylene recycled from milk containers. A coextruded blend including 50 percent polystyrene and 50 percent recycled HDPE (by weight) provides somewhat higher yield strength and compression modulus than other blends of plastics such as 100 percent tailings fraction. These results have not been widely accepted in light of the common knowledge in the art that polystyrene and polyethylene are immiscible and mutually incompatible plastics which ordinarily would be expected to yield poor properties if processed together. The methods according to this paper have been subject to unpredictable batch to batch variations in practice. Thus different batches of the polyethylene/polystyrene blend according to the Renfree et al. paper with ostensibly similar composition and processing conditions have produced markedly different physical properties. These inexplicable variations have posed a significant deterrent to any attempt at practical application of the Renfree et al. teachings regarding such blends. Moreover, the Renfree et al. paper does not say whether polystyrene can be used successfully as an additive with other polyolefin or principally polyolefin plastics such as the post-consumer tailings fraction mentioned above.

Accordingly, there have been significant unmet needs for still further improvement.

SUMMARY OF THE INVENTION

The present invention addresses these needs.

One aspect of the present invention provides methods of making plastics composites. A method according to this aspect of the present invention desirably includes the steps of making a mixed melt consisting essentially of a high melt strength polystyrene component and a polyolefin based component, i.e., a component consisting of at least about 50 percent polyolefins. Desirably, the polyolefin component includes at least about 75 percent polyolefins and more desirably up to about 100 percent polyolefins. The polyolefins in the polyolefin component typically include polyolefins selected from the group consisting of high density polyethylene, low density polyethylene, polypropolyene and mixtures thereof, and may consist essentially of high density polyethylene. The method desirably further includes the step of forming the mixed melt so that the mixed melt flows during the forming process, as by extruding the mixed melt, and then cooling the mixed melt so as to provide a solidified product.

This aspect of the present invention incorporates the discovery that use of a high melt strength polystyrene, having appreciable cohesion in the melt state above the glass transition temperature of the polystyrene provides unique advantages in the mixed melt forming and solidification processes. In particular, the high melt strength polystyrene and the polyolefin component tend to form interspersed phases, one consisting predominantly of polystyrene and the other consisting predominantly of the polyolefin component. These phases become interspersed in a manner such that the polystyrene based phase provides substantial structural reinforcement to the polyolefin based phase. As further discussed herein below, the high melt strength polystyrene tends to form a microscopic fibrous structure interspersed with the polyolefin based phase. Although the present invention is not limited by any theory of operation, it is believed that formation of such a fibrous structure, and the substantial increase in physical properties observed with highmelt strength polystyrene, derive at least in part from the melt strength of the polystyrene. It is believed that the physical cohesion of the high melt strength polystyrene based phase favors formation of interconnected fibrous structures, elongated fibers and the like rather than discrete, disconnected globules or granules of the polystyrene based phase.

A further aspect of the present invention incorporates the discovery that particularly enhanced physical properties are achieved when the polystyrene component constitutes about 30 percent to about 40 percent, and most desirably about 35 percent by weight of the mixed melt and hence constitutes about the same percentage by weight of the final product. Within this preferred range, the process yields particularly good physical properties such as particularly high compression modulus of elasticity, yield stress and compression strength. Although all of these properties tend to increase generally with the percentage of polystyrene at least up to about 50 percent polystyrene by weight, the values observed in the preferred range, and particularly at about 35 percent, are surprisingly high and are significantly greater than would be expected from the general trend of increase with increasing polystyrene content. Here again, the present invention is not limited by any theory of operation. However, it is believed that the extraordinary properties achieved in this particular range of compositions result at least in part from a unique structure which forms within this range. In the preferred range, and particularly at about 35 percent polystyrene by weight, the polystyrene based and polyethylene based phases tend to exhibit an interpenetrating structure in which both phases are continuous and both phases are entangled with one another. Moreover, with the preferred ranges of polystyrene contents, the polyolefin phase appears to have a depressed degree of crystallinity.

Additional aspects of the present invention incorporate the discovery that the results discussed above occur even where the polyolefin based component includes substantial amounts of impurities such as non-polyolefin polymers pigments and uncharacterized contaminants dispersed in or dissolved in the polyolefins. Thus, the polyolefin based phase may be a fraction recovered from a mixed plastics waste stream such as the aforementioned tailings fraction. This aspect of the present invention provides improved processes for recycling plastics waste. Processes according to this aspect of the present invention may include the step of recovering a polyolefin based fraction from a mixed plastics waste stream, making a mixed melt including the polyolefin based fraction and a high melt strength polystyrene component, forming the mixed melt so that the mixed melt flows during forming and then cooling and solidifying the formed mixed melt to form a solid product. The recovering step desirably includes the step of removing PET containers from the mixed waste stream and may also include the step of removing polyethylene containers such as milk containers from the mixed waste stream to leave as the polyolefin based fraction the aforementioned tailings fraction. The tailings fraction is then blended with the polystyrene based component to form the mixed melt. Alternatively, some or all of the polyethylene based containers in the waste stream may be left in the fraction used in the mixed melt. Desirably, the fraction includes at least about 50 percent, and preferably at least about 75 percent polyolefins, and desirably the polyolefins in the fraction include mainly high density polyethylene.

A further aspect of the present invention provides a plastics composite consisting essentially of a polyolefin component and a polystyrene component, the composite including a fibrous phase consisting essentially of the polystyrene component, interspersed with a polyolefin based phase consisting essentially of the polyolefin component, the two phases cooperatively constituting a substantially solid matrix in which the polystyrene based phase mechanically reinforces the polyolefin based phase. The polystyrene based and polyolefin based phases may constitute substantially interpenetrating networks. The polystyrene based phase may constitute discrete elongated fibers extending generally codirectionally with one another and dispersed in the polyethylene based phase. The fibers desirably have a mean length to diameter ratio of at least about 5 and more desirably at least about 8, and typically have a mean diameter less than about 15 microns. The polystyrene component preferably constitutes about 30 percent to about 40 percent by weight of the composite and most preferably constitutes about 35 percent by weight of the composite. Most preferably, the polystyrene component is a high melt strength polystyrene. The polyolefin component desirably includes a recycled fraction.

DETAILED DESCRIPTION OF THE PREFERRED EMBODIMENTS

A method in accordance with one embodiment of the present invention begins with a mix of plastics waste products collected from residences by a municipal recycling program. The recycling program is conducted under a plan which asks consumers to deposit only unpigmented high density polyethylene and polyethylene terephthalate bottles. The polyethylene terephthalate ("PET") soda bottles and high density polyethylene ("HDPE") milk containers are manually removed from the stream of plastic waste collected in the recycling program. After such removal, there is still a substantial fraction of unwanted, commingled plastics. This mixture is referred to as "curbside tailings" to indicate that it represents the tailings fraction of materials collected "at curbside" from the residences. Also, the material may be referred to by the geographic location of the recycling program as, e.g., New Jersey curbside tailings or "NJCT" to refer to the curbside tailings fraction of plastic waste retrieved within New Jersey. The term "NJCT" as used in this disclosure should be understood as referring to such a fraction.

Tailings fractions such as NJCT consist principally of polyolefins. They typically incorporates more than about 75% polyolefins, and ordinarily more than about 90% polyolefins. The polyolefins in NJCT ordinarily include more than about 50% by weight high density polyethylene, and typically more than 75% by weight high density polyethylene. NJCT may include minor or trace amounts of low density polyethylene, polypropylene and other polyolefins as well as some small amounts of other plastics such as polyvinylchloride, polyvinylidene chloride, and poltstyrene. The non-polyolefin plastics, when present in NJCT, typically are present in amounts so small that they do not appreciably change the properties of the mixture. Although the composition of NJCT varies slightly from day-to-day depending upon the exact items collected, NJCT can be said to consist essentially of polyolefins.

NJCT has a bimodal molecular weight distribution and hence also has a bimodal melt flow distribution. That is, the polyolefins in NJCT include a high melt flow (typically, low molecular weight) component having a melt flow index of at least about 10 and preferably somewhat higher, and also include a low melt flow component having a melt flow index of about three and desirably even lower, such as below about 1.0. As used in this disclosure with reference to polyolefins, the term "melt flow index" should be understood as referring to the melt flow index as measured in accordance with American Society For Testing and Materials ("ASTM") standard D1238-86, according to condition 190/2.16 of that standard, unless otherwise specified. The melt flow index of each component must be measured separately. The melt flow index test, if applied to the mixture per se would yield only a single, aggregate melt flow index figure for the entire mixture. Therefore, references to the melt flow indices of components in a mixture of plural plastics should be understood as referring to the melt flow indices of these components taken individually.

The milk containers removed from the incoming waste stream provide another useful source of a plastic material consisting essentially of polyolefins. Typically, the milk containers removed from the stream consist essentially of high density polyethylene, and have bimodal molecular weight and melt flow index distributions. Thus, the recovered milk containers typically include the container walls, which are composed of relatively low melt flow HDPE, typically having melt flow less than about three and ordinarily less than about one, and also include a minor fraction of bottle cap material which has a relatively high melt flow index, typically above about 10.

Thus, the incoming waste, after removal of the PET bottles, yields two different components, each consisting essentially of polyolefins viz, the HDPE bottles and the NJCT. Either of these components, or mixtures of the two, maybe employed as a polyolefin based fraction in manufacture of composites including the present invention. Mixtures of the HDPE bottle fraction and the NJCT fraction can also be employed. Further, other polyolefin based plastics can be utilized, including virgin HDPE and/or mixtures of virgin polyolefins can be employed. Likewise, virgin polyolefins can be incorporated in mixture with recycled polyolefins such as recycled milk bottles and/or NJCT and other tailings fractions.

The polyolefin component desirably is comminuted to a reasonable particle size for handling and processing in plastics forming equipment such as mixers, extruders and the like. The particle size is ordinarily not critical, so that particle sizes corresponding generally to those employed for plastics resin pellets are useful. Thus the polyolefins component may be comminuted to about one cm or smaller particles. Where the polyolefin fraction is reclaimed from a waste stream, it typically includes many thin walled items such a containers, films and the like. In this case, the polyolefin component, after communiution, ordinarily will be in the form of flat flakes with major dimensions of about 1 cm or less and minimum dimensions of about 1 mm or less.

The polyolefin component is used in conjunction with a polystyrene based component. The polystyrene based component most preferably consists essentially of polystyrene, and the polystyrene based component desirably has high storage modulus, most preferably above about $10^6$ Pascals and preferably above about $10^7$ Pascals. As used in this disclosures with reference to polystyrene and/or polystyrene based materials, the term "storage modulus" should be understood as referring to the storage modulus of the polystyrene base component measured at 10 hz, 200 degrees C, with strain of 1% of less using a Rheometrics cone and plate apparatus of the type supplied by Rheometrics Inc. of Piscataway, New Jersey. The storage modulus value, commonly referred to in the literature as G' represents a measure of the tendency of a molten polymer to store energy upon deformation. The storage modulus of a polymer thus represents a measure of the degree of cohesion of the polymer in the molten state. An ideal Newtonian fluid which does not store any energy upon deformation would have a storage modulus of 0. Storage modulus is measured by applying a cyclical, known strain to the material and monitoring the stress, as by monitoring the forces exerted by or on the material. With material having storage modulus of 0, the stress is exactly out of phase with the strain. As the storage modulus of the material increases from 0, the stress and strain become in phase. Techniques for measuring storage modulus are well known to those skilled in the art of polymer science.

The polystyrene component may be either a virgin polymer or recycled material. Generally, high average molecular weight polystyrenes tend to have high storage modulus, although the storage modulus also depends to some degree upon the molecular weight distribution as well as the average molecular weight. Recycled polystyrenes can be employed, but should be selected with respect to their storage modulus. For example, some recycled polystyrene derived from foamed polystyrene containers have the desired high storage modulus, whereas others do not. Streams of waste polystyrenes with consistent storage modulus values are obtainable from the scrap generated in manufacture of food trays and also from high volume users of such products, such as institutions and so called "fast food"restaurants which obtain containers in uniform grades from the consistent suppliers. Where recycled polystyrenes are employed, the same desirably are comminuted to substantially the same particular sizes as discussed above with respect to the polyolefin component. Where the polystyrene is derived from foamed polystrene waste, it is desirable to compress or repelletize the material to a substantially solid form before use.

The polystyrene and the polyolefin component desirably are blended using conventional plastics processing equipment such as tumble blenders. Alternatively, the polystyrene and polyolefin components may be metered simultaneously into the melt processing equipment and blended within the melt processing equipment. The polystyrene and polyolefin components are converted to a mixed melt by supplying energy to the blended components while mixing them. Some or all of the energy may be supplied as mechanical energy by the mixing apparatus. For example, in a so called adiabatic extruder, the material being processed is introduced into a chamber and heated and mixed within the chamber by one or more moving elements such as screws, drums or the like so as to convert the material to a mixed melt. The same moving elements pressurize the melt so that the melt flows out of the chamber through an exit port. The blended material desirably has a relatively short residence time in the mixing apparatus, so that the mixed melt is expelled from the mixing chamber as soon as it reaches the melt state.

As used in this disclosure with reference to a thermoplastic material or combination of thermoplastic material, the term "melt" refers to such a material in a flowable state, as distinguished from a substantially solid, non-flowable state. This term is used regardless of whether the transformation from solid state to flowable state involves melting of a crystalline phase or transformation of an amorphous phase into a flowable state. Likewise, unless otherwise specifically indicated, the verb "melt" as used in this disclosure is intended to refer to transformation from the solid state to the flowable state, again regardless of whether the solid state is crystalline or amorphous. In forming the mixed melt in the present process, the temperature of the material should be raised to above the glass transition temperature of the polystyrene and above the crystalline melting temperature of the polyolefin component.

The processing equipment desirably is arranged so that the mixed melt flowing from the exit port of the mixing chamber flows to form a product of the desired size and shape. Thus, the processing equipment may have an extrusion die arranged at the exit orifice of the mixing chamber so that the mixed melt is formed into a desired cross section as it passes through the die. Alternatively, the processing equipment may be provided with one or more hollow molds in communication with the exit port so that the mixed melt flows from the exit orifice into the molds to form products of the desired size and shape. The processing equipment desirably also includes appropriate devices for cooling the mixed melt after it flows to form the desired product so as to thereby solidify the mixed melt. As will be readily appreciated by those of ordinary skill in the plastics forming arts, many conventional extrusion and molding machines have these elements, and can be employed in processing the blended components.

Merely by way of example, the blended components may be processed using an extrusion molding machine of the type sold under the designation ET/1 by Advanced Recycling Technology Limited of Belgium. The ET/1 extrusion molding machine incorporates an extrusion section having a screw disposed within a mixing and extrusion chamber. The screw is driven in rotation by a hydraulic power unit. The power supplied by the hydraulic power unit is converted into heat within the mixing chamber by the interaction of the screw and the material being processed, and the screw pressurizes the molten material within the chamber and forces it out through the an exit port at a downstream end of the chamber. The length to diameter ratio of the screw in the ET/1 machine is about 11:1. The ET/1 machine is equipped with a plurality of elongated hollow molds disposed on a rotable carousel so that each mold can be brought into alignment with the exit orifice of the extrusion apparatus and filled by the material forced out of the extruder. A water bath is provided for cooling the molds after the same have been filled.

Desirably, the blended components are brought to a temperature above about 180° and typically between about 180° C. and 240° C., more preferably between about 200° C. and 220° C. in making the mixed melt. The mixed melt desirably is at a temperature within these ranges when the mixed melt is caused to flow to form the desired article. The product desirably is cooled to below the glass transition temperature of the polystyrene component and below the crystalline melting point of the polyolefin component to solidify the product. Desirably, the product is cooled to below about 50° C. and typically to about room temperature i.e., about 20° C. The product ordinarily is retained in the desired shape during the cooling cycle, as by a mold in a molding process. In an extrusion process, the product may be partially or entirely unconstrained during cooling.

The product after cooling ordinarily has a two phase microstructure. One phase consists essentially of the polystyrene component, whereas the other phase consists essentially of the polyolefin component. Where the product includes less than about 50% of the polystyrene component, the polystyrene-based phase is present as a generally fibrous structure. At relatively low polystyrene contents, typically about 30% or less, the product has distinct elongated fibers consisting essentially of the polystyrene component. These fibers extend substantially codirectionally with one another, generally in the flow direction i.e., the direction in which the mixed melt flowed during the formation of the product. The polystyrene fibers ordinarily have a mean diameter less than about 15 microns, and typically between about one micron and about 10 microns, and ordinarily have a mean length to diameter ratio of at least about 5. more preferably, the polystyrene component fibers have a mean length to diameter ratio of at least about 10. As used in this disclosure, the term "fiber" is not limited to fibers of round cross-section, but also includes elongated lamellae having flat or plate-like cross-section. The diameter of such a non-round fiber can be taken as the mean dimension transverse to the direction of elongation of the fiber. At polystyrene contents above about 30% to about 50%, the polystyrene component is still present substantially as a fibrous structure, but there is substantial intertwining and merging of various polystyrene fibers, so that the polystyrene component forms a three dimensional network in which it is difficult to characterize any single strand of the network as constituting an individual fiber. At these polystyrene contents, the polyolefin component also forms a three dimensional network. The polystyrene component and polyolefin component networks are interengaged and interpenetrating with one another. This structure is particularly prevalent at polystyrene contents of about 35%. The polystyrene component substantially reinforces the polyethylene component.

The following non-limiting examples illustrate certain features of the present invention.

EXAMPLES I-VII

Various blends of New Jersey curbside tailings ("NJCT") and polystyrene are processed using the aforementioned ET/1 extrusion molding apparatus. The molds utilized have 6.4 cm square cross sections and are 2.41 meters long. The NJCT utilized in all cases comes from a single batch of uniform composition, containing at least about 80% high density polyethylene. The polystyrene is from a single batch having storage modulus of over $10^6$ Pascals. The various mixtures shown in Table 1 are processed under substantially uniform conditions. For example, the screw speed is maintained constant throughout all runs. Mixing chamber or "cylinder" temperature and the temperature of the extrusion die are also within about 10° C. over all runs as indicated below in Table 1. The resulting product, in the form of bars 2.41 meters long nd 6.4 cm square in cross section, is intended for use as a structureal material and as a replacement for lumber. 12.8 cm long sections are cut from the center of each bar and subjected to physical property testing with results as indicated below in Table 1. In each case, the results represent a single run except for Example I, which represents an average of several runs.

compressive strength are all higher than those achieved at 40% polystyrene.

Figure 1:
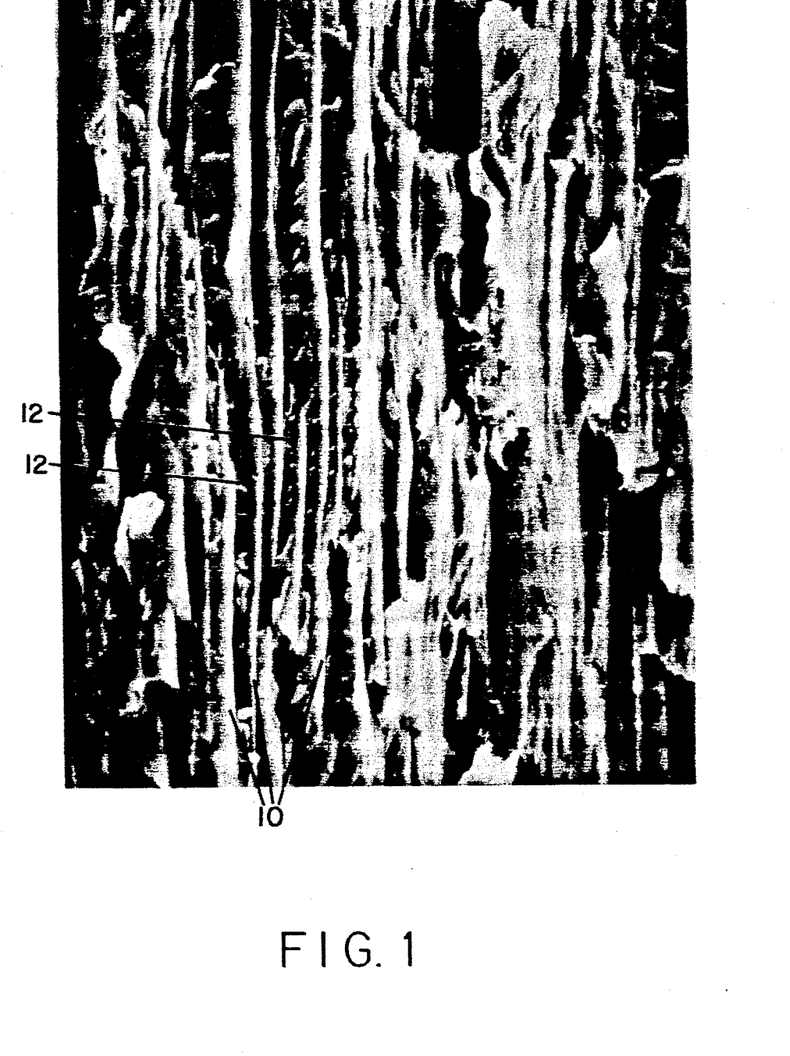
FIG. 1 is a microphotograph of a plastics composite in accordance with one embodiment of the invention.
Figure 2:
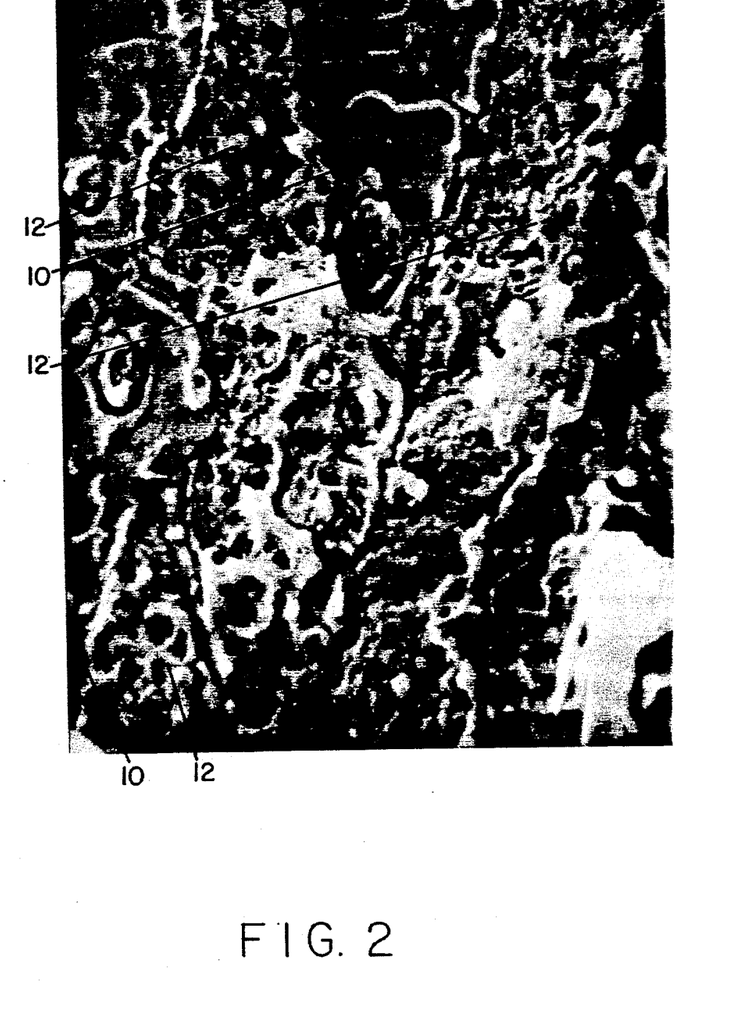
FIG. 2 is a further microphotograph of the composite of FIG. 1.

The 35% polystyrene material is fractured and subjected to scanning electron microscopy. The product has an appearance as shown in FIGS. 1 and 2. FIG. 1 represents a photograph of a plane generally parallel to the direction of flow, i.e., generally parallel to the length of the bar, whereas FIG. 2 is a end view, looking generally parallel to the direction of flow at a surface lying transverse to the direction of flow and hence transverse to the length of the bar. The relatively smooth, fibrous appearing structures 10 in FIG. 1 represent the polystyrene phase, whereas the stippled regions 12 represent the polyolefin based phase. The fibrous regions 10 extend generally in the direction of flow, but with substantial extent transverse to the direction of flow. In FIG. 2, the relatively smooth areas 10 represent the polystyrene based phase whereas the heavily stippled regions 12 represent the polyolefin based phase. The heavily intertwined and interengaged nature of the components is readily seen in FIG. 2.

Figure 3:
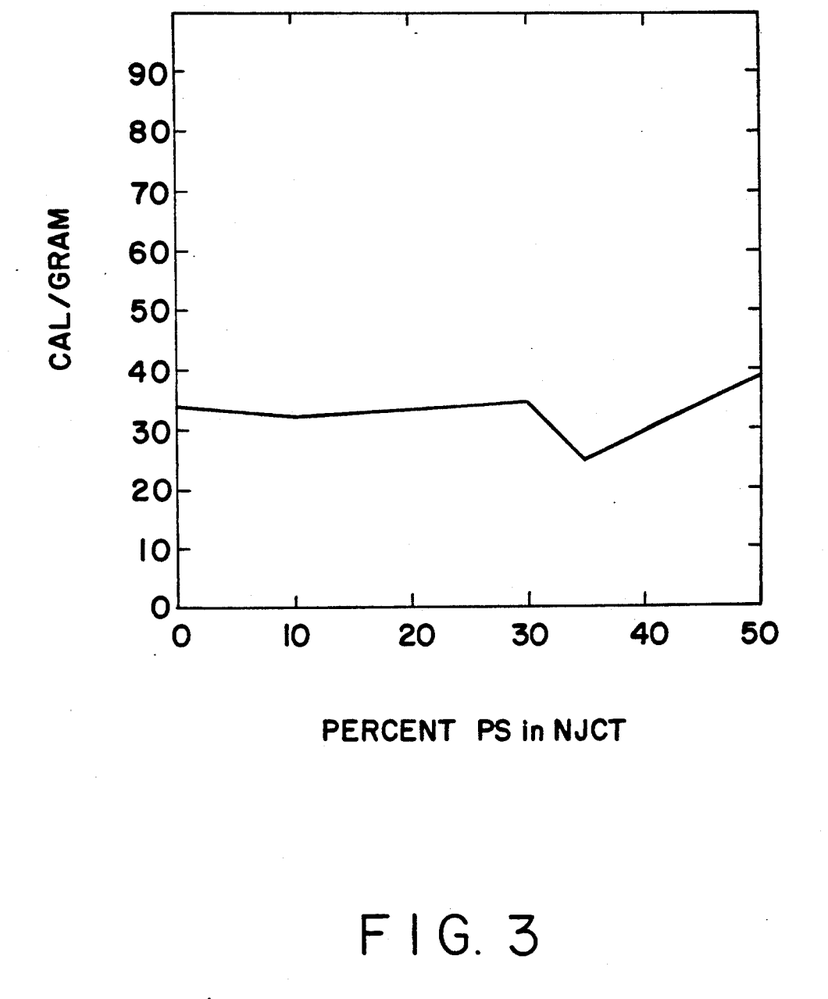
FIG. 3 is a graph of certain thermal properties versus polystyrene content.

The crystallinity of the polyolefin based phase in the product is measured by the conventional thermal analysis techniques which measure the latent heat of fusion of the polyolefin based phase. The results are as shown in FIG. 3. There is a distinct minimum in this parameter at 35% polystyrene. This demonstrates that the polyolefin phase has a depressed degree of crystallinity where the composite includes about 35% polystyrene.

Comparative Example VIII

TABLE 1

| EXAMPLE COMPOSITION | MODULUS PSI | YIELD STRESS PSI | COMP. STRENGTH PSI | TEMPERATURE, °C. CYLINDER/DIE |
|---|---|---|---|---|
| I 100% NJCT | 90000 | 2700 | 3170 | VARIOUS |
| II 10% PS 90% NJCT | 144,370 | 3100 | 3220 | 210/210 |
| III 20% PS 80% NJCT | 163,390 | 3860 | 3860 | 210/210 |
| IV 30% PS 70% NJCT | 197,600 | 4350 | 4350 | 210/210 |
| V 35% PS 65% NJCT | 239,000 | 4950 | 4950 | 220/220 |
| VI 10% PS 60% NJCT | 222,300 | 4750 | 4750 | 210/210 |
| VII 50% PS 50% NJCT | 220,000 | 5320 | 5320 | 210/210 |

In the physical property data of Table 1, the compressive modulus for each sample is determined by the slope of the best fit straight line through the low strain region of a stress-strain diagram. The compressive yield stress is determined as the stress to the yield point or, where there is no discernable yield point, as the stress to produce 2% offset from the straight line extrapolation of the initial stress-strain line near 0 strain, commonly referred to as the "2% offset method." The compressive strength is defined as the maximum compressive stress carried by a sample during a compression experiment except in the case where the material deforms to 10% compressive strain without any discernible maximum stress. In this case the compression strength is taken as being the stress at 10% strain. The physical properties are measured with stresses and strains parallel to the direction of flow during formation of the product, i.e., parallel to the long dimension of the bars.

The results indicate that addition of the high melt strength polystyrene dramatically increases the compressive modulus, yield stress and compression strength, even where relatively small quantities, such as 20% or less polystyrene are employed. These properties improve progressively with increasing polystyrene content, but the results achieved are surprisingly and unexpectedly favorable at 35% polystyrene. Thus at 35% polystyrene the compressive modulus, yield stress and The procedure of Example V is repeated except that the polystyrene employed has a low storage modulus, appreciably less than 106 Pascals. The resulting product has a compression modulus of only 175,500 pounds per square inch versus 239,000 pounds per square inch in Example V. The yield stress is only 3,790 psi versus 4,950 psi for example 5 and the compression strength is only 3,790 psi versus 4,950 psi for example V.

As numerous variations and combinations of the features described above can be utilized without departing from the present invention as defined by the claims, the foregoing description of the preferred embodiments should be taken by way of illustration rather than by way limitation of the invention. Merely by way of example, additives such as pigments, stabilizers and the like can be incorporated in the next melt. Also, the material may be processed into essentially any shape or form desired.

We claim:

1. A method of making a plastics composite comprising the steps of:

a. making a mixed melt consisting essentially of a polystyrene having a storage modulus of at least about $10^6$ Pascals and a polyolefin component incorporating one or more polyolefins, said polystyrene and said polyolefin component being in intimate admixture with one another;
b. forming said mixed melt so that said melt flows during said forming step; and
c. cooling said formed mixed melt to solidify the same and thereby form a solid product.

2. A method as claimed in claim 1 wherein said forming step includes the step of extruding said mixed melt.

3. A method as claimed in claim 2 wherein said extruding step includes the step of extruding said mixed melt into a mold, said cooling step including the step of cooling said mold.

4. A method as claimed in claim 1, wherein said polystyrene has a storage modulus of at least about $10^7$ Pascals.

5. A method as claimed in claim 1 wherein said polyolefin component includes at least about 75% by weight of polyethylene, polypropylene and combinations thereof.

6. A method as claimed in claim 5 wherein said polyolefin component includes at least about 50% by weight high density polyethylene.

7. A method as claimed in claim 6, wherein said polyolefin component includes at least about 75% by weight high density polyethylene.

8. A method as claimed in claim 7, wherein said polyolefin component consists essentially of high density polyethylene.

9. A method as claimed in claim 5 wherein said polyolefin component includes a low melt flow component and a high melt flow component having a melt flow index substantially higher than the melt flow index of said low melt flow component.

10. A method as claimed in claim 9 wherein said low melt flow component has a melt flow index of about 3 or less and wherein said high melt flow component has a melt flow index of at least about 10.

11. A method as claimed in claim wherein said mixed melt includes between about 30% and about 40% of said polystyrene and at least about 50% of said polyolefin component.

12. A method as claimed in claim 11 wherein said mixed melt includes about 35% by weight of said polystyrene, and about 65% by weight of said polyolefin component.

13. A method of recycling postconsumer plastics waste comprising the steps of:
a. recovering from said waste a fraction including at least about 75% by weight of polyolefin component;
b. making a mixed melt consisting essentially of said recovered faction and a polystyrene having a storage modulus of at least about $10^6$ Pascals in intimate admixture with one another;
c. forming said mixed melt so that said mixed melt flows during said forming step; and
d. cooling said formed mixed melt to solidify the same and thereby form a solid product.

14. A method as claimed in claim 13 wherein said recovering step includes the step of removing identifiable polyethylene terepthalate containers from said waste so that the recovered fraction excludes said removed polyethylene terepthalate containers.

15. A method as claimed in claim 14 wherein said recovering step includes the step of removing unpigmented polyethylene containers from said waste so that said recovered fraction excludes the removed polyethylene containers.

16. A method as claimed in claim 13 wherein said mixed melt includes between about 30% and about 40% by weight of said polystyrene and wherein the remainder of said mixed melt consists essentially of said recovered fraction.

17. A method as claimed in claim 16 wherein said mixed melt includes about 35% by weight of said polystyrene.

18. A method as claimed in claim 13 wherein said polystyrene has a storage modulus of at least about $10^7$ Pascals.

19. A method as claimed in claim 13 wherein said solid product includes a phase consisting essentially of said polystyrene interspersed with a phase consisting essentially of said recovered fraction.

20. A method as claimed in claim 19 wherein said solid product has interpenetrating networks of said phases.

* * * * *

UNITED STATES PATENT AND TRADEMARK OFFICE
CERTIFICATE OF CORRECTION

PATENT NO. : 5,298,214

DATED : March 29, 1994

INVENTOR(S) : Morrow et al

It is certified that error appears in the above-identified patent and that said Letters Patent is hereby corrected as shown below:

Column 3, line 22 "highmelt" should read -- high melt --.

Column 6, line 37, "G'" (G apostrophe) should be -- G' -- (G prime).

Column 9, line 24, "nd" should read -- and --.

Column 9, lines 25 and 26, "structureal" should read -- structural --.

Column 10, line 46, "106" should read -- $10^6$ --.

Column 11, line 39, after "claim" insert -- 1 --.

Signed and Sealed this

Sixth Day of September, 1994

Attest:

BRUCE LEHMAN

Attesting Officer     Commissioner of Patents and Trademarks